(12) United States Patent
Horie et al.

(10) Patent No.: US 12,306,472 B1
(45) Date of Patent: May 20, 2025

(54) TUNABLE LENS SYSTEMS WITH PASSIVE MATRIX ELECTRODE ARRAYS

(71) Applicant: Apple Inc., Cupertino, CA (US)

(72) Inventors: Yu Horie, Cupertino, CA (US); Patrick R. Gill, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 542 days.

(21) Appl. No.: 17/214,531

(22) Filed: Mar. 26, 2021

(51) Int. Cl.
*G02C 7/04* (2006.01)
*G02B 3/12* (2006.01)
*G02B 27/00* (2006.01)
*G02B 27/01* (2006.01)

(52) U.S. Cl.
CPC ............. *G02C 7/044* (2013.01); *G02B 3/12* (2013.01); *G02B 27/0093* (2013.01); *G02B 2027/0187* (2013.01)

(58) Field of Classification Search
CPC ...... G02C 7/044; G02B 3/12; G02B 27/0093; G02B 2027/0187
See application file for complete search history.

(56) References Cited

U.S. PATENT DOCUMENTS

| | | | |
|---|---|---|---|
| 8,248,576 B2 | 8/2012 | Chang | |
| 8,587,734 B2 | 11/2013 | Li | |
| 8,885,139 B2 | 11/2014 | Peyghambarian et al. | |
| 10,288,904 B2 | 5/2019 | Yadin et al. | |
| 10,345,656 B2 | 7/2019 | Li et al. | |
| 10,613,350 B2 | 4/2020 | Lin et al. | |

(Continued)

FOREIGN PATENT DOCUMENTS

| | | | |
|---|---|---|---|
| JP | 2008203360 A | | 9/2008 |
| JP | 2016090718 A | * | 5/2016 |
| WO | 2017216716 A1 | | 12/2017 |

OTHER PUBLICATIONS

Liwei Li et al., Near-Diffraction-Limited and Low-Haze Electro-Optical Tunable Liquid Crystal Lens with Floating Electrodes, Optical Society of America, Mar. 29, 2013, vol. 21, No. 7, Liquid Crystal Institute, Kent University, Kent, OH, United States.

(Continued)

*Primary Examiner* — Marin Pichler
*Assistant Examiner* — Justin W. Hustoft
(74) *Attorney, Agent, or Firm* — Treyz Law Group, P.C.; Kendall P. Woodruff

(57) ABSTRACT

A pair of eyeglasses may include one or more adjustable lenses. An adjustable lens may include a stack of liquid crystal cells with passive matrix electrode arrays. Each passive matrix electrode array may include a pair of orthogonal electrodes that are rotated relative to other pairs of orthogonal electrodes in the stack. Control circuitry may apply different voltage profiles to the passive matrix electrode arrays to create the desired lens characteristics in the adjustable lens. The voltage profiles may be based on a stored look-up table that maps different target lens characteristics to different voltage profiles for the passive matrix electrode arrays. The target lens characteristics may include at least one of a target lens power and a target optical aberration correction. The look-up table may be based on information gathered during design and manufacturing using numerical optimization techniques.

19 Claims, 8 Drawing Sheets

(56) References Cited

U.S. PATENT DOCUMENTS

| | | | |
|---|---|---|---|
| 2005/0180023 A1* | 8/2005 | Totzeck | G02B 5/3083 |
| | | | 359/726 |
| 2007/0024801 A1* | 2/2007 | Horiuchi | G02F 1/29 |
| | | | 349/161 |
| 2007/0279365 A1* | 12/2007 | Kageyama | G02B 7/38 |
| | | | 348/E5.045 |
| 2010/0225834 A1* | 9/2010 | Li | G02F 1/133526 |
| | | | 349/13 |
| 2013/0100364 A1 | 4/2013 | Hsiao et al. | |
| 2014/0028924 A1* | 1/2014 | Yamaguchi | G03B 17/565 |
| | | | 349/1 |
| 2014/0098226 A1* | 4/2014 | Pletcher | H04N 7/18 |
| | | | 382/103 |
| 2016/0143528 A1 | 5/2016 | Wilf et al. | |
| 2017/0068134 A1 | 3/2017 | Yadin et al. | |
| 2017/0160440 A1 | 6/2017 | Yadin et al. | |

OTHER PUBLICATIONS

Brett E. Bagwell et al. Liquid Crystal Based Active Optics, Proceedings of SPIE—The International Society for Optical Engineering, Aug. 15-16, 2006, Novel Optical Systems Design and Optimization IX—San Diego, CA, United States.

* cited by examiner

TUNABLE LENS SYSTEMS WITH PASSIVE MATRIX ELECTRODE ARRAYS

FIELD

This relates generally to optical systems and to devices with tunable lenses.

BACKGROUND

Eyewear may include optical systems such as lenses. For example, eyewear such as a pair of glasses may include lenses that allow users to view the surrounding environment.

It can be challenging to design devices such as these. If care is not taken, the optical systems in these devices may not be able to accommodate different eye prescriptions and may not perform satisfactorily.

SUMMARY

Eyeglasses may be worn by a user and may include one or more adjustable lenses each aligned with a respective one of a user's eyes. For example, a first adjustable lens may align with the user's left eye and a second adjustable lens may align with the user's right eye. Each of the first and second adjustable lenses may include one or more liquid crystal cells or other voltage-modulated optical material. Each liquid crystal cell may include a layer of liquid crystal material interposed between transparent substrates. Control circuitry may apply control signals to an array of electrodes in the liquid crystal cell to adjust a phase profile of the liquid crystal material.

The array of electrodes in each liquid crystal cell may be a passive matrix electrode array having a grid of orthogonal (or otherwise non-parallel) electrodes that adjusts a phase profile of the liquid crystal layer along first and second dimensions. The liquid crystal cell may be stacked with other liquid crystal cells with respective passive matrix electrode arrays that are rotated relative to one another. Control circuitry may apply different voltage profiles to the different passive matrix electrode arrays in the stack to create a desired set of lens characteristics in the adjustable lens.

The control circuitry may store a look-up table that maps different target lens characteristics to different voltage profiles for the passive matrix electrode arrays. The target lens characteristics may include at least one of a target lens power and a target optical aberration correction. The look-up table may be based on data gathered during design and manufacturing using numerical optimization techniques.

Liquid crystal materials are herein used by way of an example of an electrically modulated optical material. Other electrically modulated optical materials can be used in place of the liquid crystals described herein.

DETAILED DESCRIPTION

Figure 1:
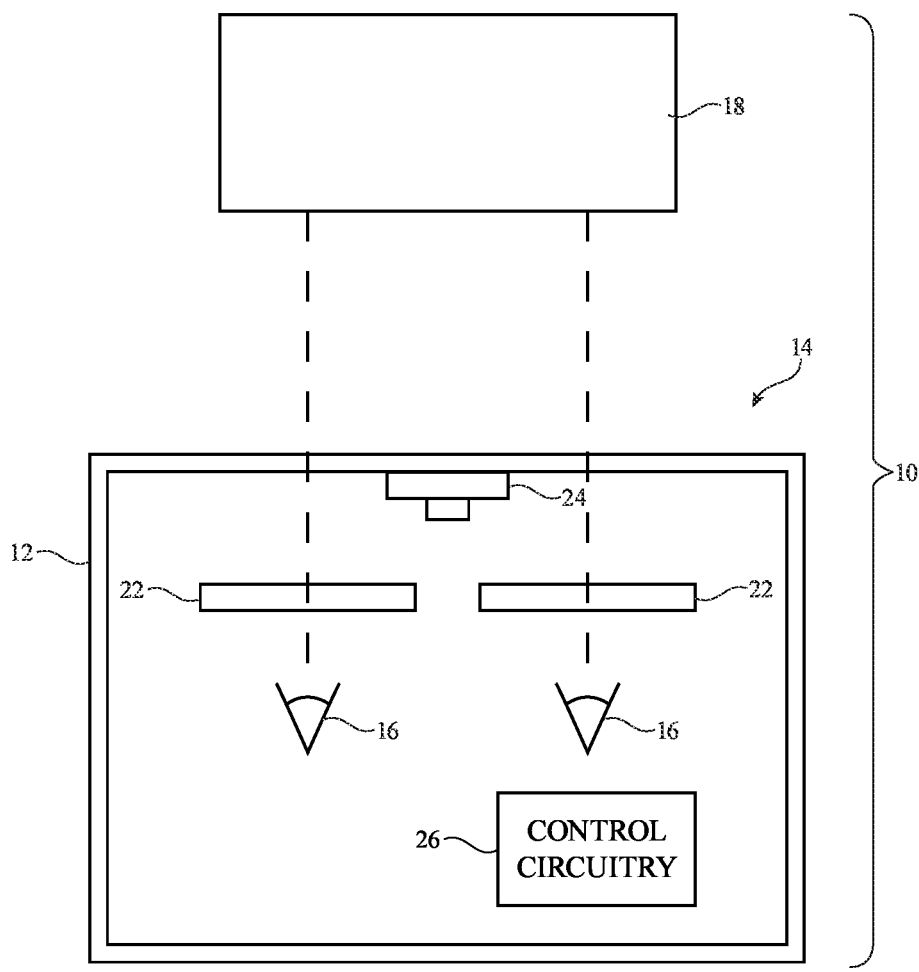
FIG. 1 is a diagram of illustrative system that includes eyeglasses with adjustable lenses in accordance with an embodiment.

An illustrative system having a device with one or more electrically adjustable optical elements is shown in FIG. 1. System 10 may include a head-mounted device such as eyeglasses 14 (sometimes referred to as glasses 14). Glasses 14 may include one or more optical systems such as adjustable lens components 22 mounted in a support structure such as support structure 12. Structure 12 may have the shape of a pair of eyeglasses (e.g., supporting frames), may have the shape of goggles, may form a housing having a helmet shape, or may have other configurations to help in mounting and securing the components of glasses 14 on the head of a user.

Adjustable lens components 22 may form lenses that allow a viewer (e.g., a viewer having eyes 16) to view external objects such as object 18 in the surrounding environment. Glasses 14 may include one or more adjustable lens components 22, each aligned with a respective one of a user's eyes 16. As an example, lens components 22 may include a left lens 22 aligned with a viewer's left eye and may include a right lens 22 aligned with a viewer's right eye. This is, however, merely illustrative. If desired, glasses 14 may include adjustable lens components 22 for a single eye.

Adjustable lenses 22 may be corrective lenses that correct for vision defects. For example, eyes 16 may have vision defects such as progressive or static myopia, hyperopia, presbyopia, astigmatism, higher-order aberrations, and/or other vision defects. Corrective lenses such as lenses 22 may be configured to correct for these vision defects. Lenses 22 may be adjustable to accommodate users with different vision defects and/or to accommodate different focal ranges. For example, lenses 22 may have a first set of optical characteristics for a first user having a first prescription and a second set of optical characteristics for a second user having a second prescription. Glasses 14 may be used purely for vision correction (e.g., glasses 14 may be a pair of spectacles) or glasses 14 may include displays that display virtual reality, mixed reality, and/or augmented reality content (e.g., glasses 14 may include a head-mounted display). In virtual reality or augmented reality systems, adjustable lens components 22 may be used to move content between focal planes from the perspective of the user. Arrangements in which glasses 14 are spectacles that do not include displays are sometimes described herein as an illustrative example.

Glasses 14 may include control circuitry 26. Control circuitry 26 may include processing circuitry such as microprocessors, digital signal processors, microcontrollers, baseband processors, image processors, application-specific integrated circuits with processing circuitry, and/or other processing circuitry and may include random-access memory, read-only memory, flash storage, hard disk storage, and/or other storage (e.g., a non-transitory storage media for storing computer instructions for software that runs on control circuitry 26).

If desired, control circuitry 26 may include one or more energy storage devices such as one or more batteries and capacitors. Energy storage devices in eyeglasses 14 may be charged via a wired connection or, if desired, eyeglasses 14 may charge energy storage devices using wirelessly received power (e.g., inductive wireless power transfer, capacitive wireless power transfer, and/or other wireless power transfer configurations).

Glasses 14 may include input-output circuitry such as eye state sensors, range finders disposed to measure the distance to external object 18, touch sensors, buttons, microphones to gather voice input and other input, sensors, and other devices that gather input (e.g., user input from viewer 16) and may include light-emitting diodes, displays, speakers, and other devices for providing output (e.g., output for viewer 16). Glasses 14 may, if desired, include wireless circuitry and/or other circuitry to support communications with a computer or other external equipment. If desired, a sensor system such as sensor system 24 may be used to gather input during use of glasses 14. Sensor system 24 may include an accelerometer, compass, an ambient light sensor or other light detector, a proximity sensor, a scanning laser system, and other sensors for gathering input during use of glasses 14. Sensor system 24 may be used to track a user's eyes 16. For example, sensor system 24 may include one or more digital image sensors, lidar (light detection and ranging) sensors, ultrasound sensors, or other suitable sensors for tracking the location of a user's eyes. As an example, sensor system 24 may be used by control circuitry 26 to gather images of the pupils and other portions of the eyes of the viewer. The locations of the viewer's pupils and the locations of the viewer's pupils relative to specular glints from light sources with known positions or the rest of the viewer's eyes may be used to determine the locations of the centers of the viewer's eyes (i.e., the centers of the user's pupils) and the direction of view (gaze direction) of the viewer's eyes. In some arrangements, sensor system 24 may include a wavefront sensor that measures the aberrations of a user's eyes. Control circuitry 26 may then adjust the optical properties of lens components 22 to correct the user-specific and/or user-and-accommodation-specific aberrations detected by the wavefront sensor.

Adjustable lens components 22, which may sometimes be referred to as adjustable lenses, adjustable lens systems, adjustable optical systems, adjustable lens devices, tunable lenses, fluid-filled variable lenses, etc., may contain electrically adjustable material such as liquid crystal material, volume Bragg gratings, or other electrically modulated material that may be adjusted to produce customized lenses. Each of components 22 may contain one or more arrays of electrodes that apply electric fields to portions of a layer of liquid crystal material or other voltage-modulated optical material with an electrically adjustable index of refraction (sometimes referred to as an adjustable lens power or adjustable phase profile). By adjusting the voltages of signals applied to the electrodes, the index of refraction profile of components 22 may be dynamically adjusted. This allows the size, shape, and location of the lenses formed within components 22 to be adjusted.

Figure 2:
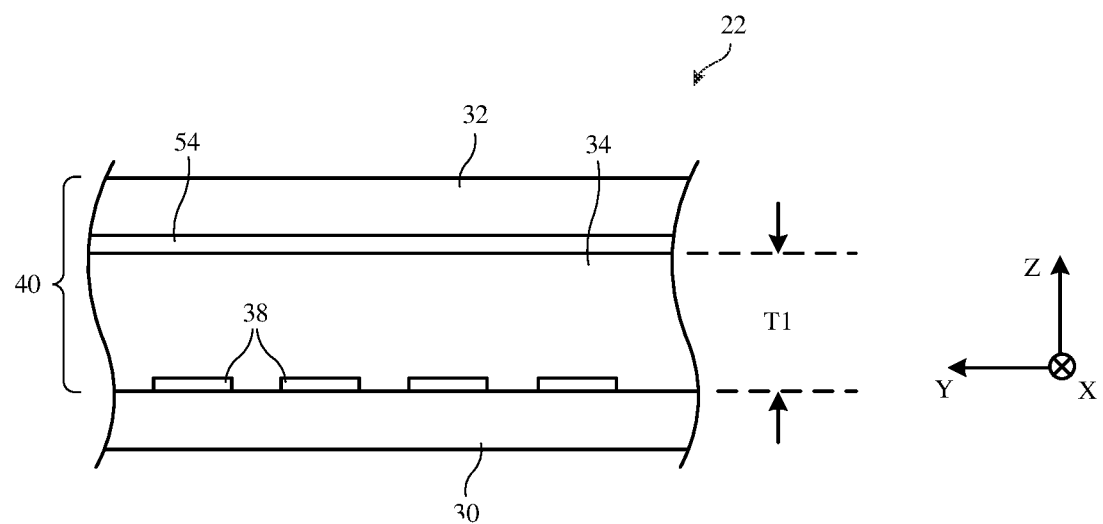
FIG. 2 is a cross-sectional side view of an illustrative liquid crystal cell that may be used to form an adjustable lens in accordance with an embodiment.

A cross-sectional side view of an illustrative adjustable lens component is shown in FIG. 2. As shown in FIG. 2, component 22 may include liquid crystal cell 40. Liquid crystal cell 40 may have a layer of voltage-modulated optical material such as liquid crystal layer 34. Liquid crystal layer 34 may be interposed between transparent substrates such as upper substrate 32 and lower substrate 30. Substrates 32 and 30 may be formed from clear glass, sapphire or other transparent crystalline material, cellulose triacetate, transparent plastic, or other transparent layers. Component 22 may have a pattern of electrodes that can be supplied with signals from control circuitry 26 to produce desired voltages on component 22. In the example of FIG. 2, these electrodes include one or more electrodes 38 on substrate 30 and one or more electrodes such as electrode 54 on substrate 32. Electrodes 54 and 38 may be formed from transparent conductive material such as indium tin oxide, conductive polymers such as poly(3,4-ethylenedioxythiophene) polystyrene sulfonate (PEDOT:PPS), silver nanowires, or other transparent electrode structures and may be located on outer and/or inner surfaces of substrates 32 and 30.

It should be understood that liquid crystal material is merely an example of an electrically modulated optical material that may be modulated using electrodes 38 in cells 40. If desired, cells 40 may include any other suitable type of electrically modulated optical material in place of the liquid crystal material in cells 40.

In some arrangements, electrodes 38 may be strip-shaped finger electrodes that run along the X dimension on substrate 30, and electrode 54 may be a blanket layer of conductive material on substrate 32 that forms a common electrode (e.g., a uniform ground plane). If desired, common electrode 54 may instead be formed on substrate 30 and finger electrodes 38 may be formed on substrate 32. The example of FIG. 2 is merely illustrative.

In arrangements where electrodes 38 are patterned finger electrodes and electrode 54 is a blanket common electrode, control circuitry 26 may be configured to apply a one-dimensional voltage profile across liquid crystal layer 34. In the example of FIG. 2, strip-shaped electrodes 38 (sometimes referred to as finger electrodes, patterned electrodes, etc.) extend parallel to the X-axis. This allows the index-of-refraction profile (sometimes referred to as the phase profile) of liquid crystal cell 40 to be modulated in the Y dimension by applying the desired voltages to each finger electrode 38. At each location of electrode strips 38 in component 22, a desired voltage may be applied across liquid crystal layer 34 by supplying a first voltage to electrode 38 and a second voltage (e.g., a ground voltage) to common electrode 54. The liquid crystal between the two electrodes will receive an applied electric field with a magnitude that is determined by the difference between the first and second voltages on the electrodes. By controlling the voltages on electrodes 38 and common electrode 54, the index of refraction of liquid crystal layer 34 of component 22 can be dynamically adjusted across a given dimension (e.g., across the Y dimension of FIG. 2) to produce customized lenses.

In other arrangements, both the upper and lower arrays of electrodes in cell 40 may include strip-shaped finger electrodes, forming a grid of orthogonal (or otherwise non-parallel) conductive lines that can be driven at different voltages using a passive matrix addressing scheme. This type of arrangement is illustrated in FIG. 3.

Figure 3:
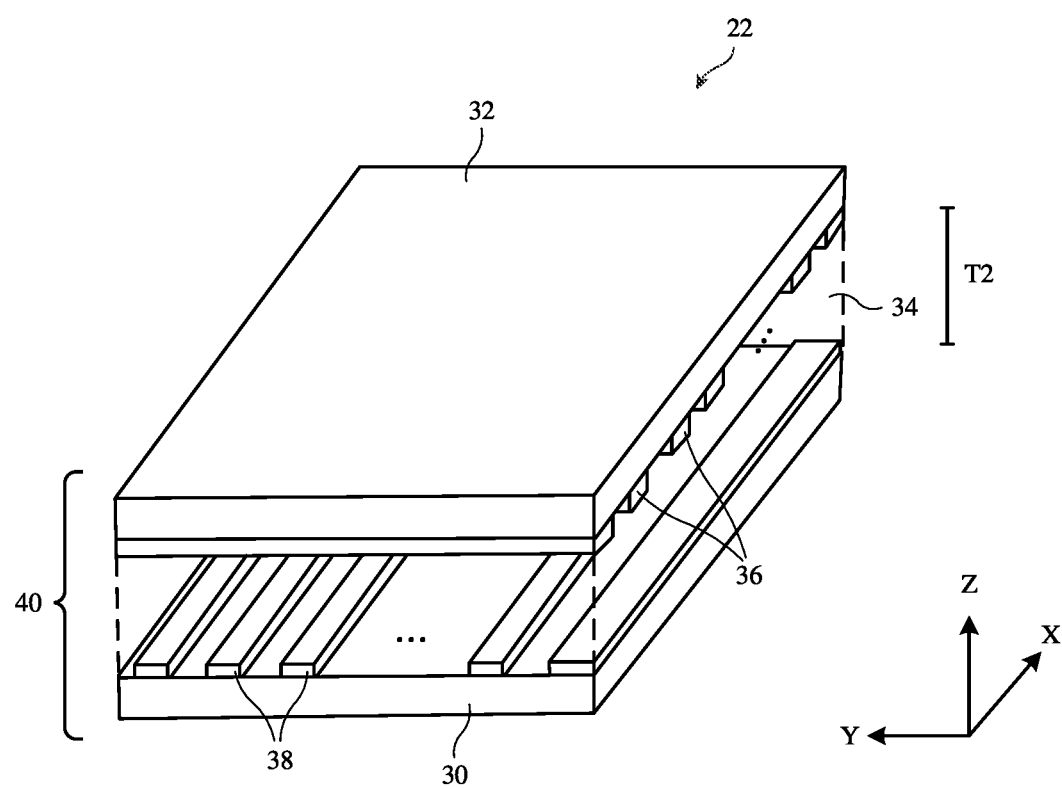
FIG. 3 is a perspective view of an illustrative liquid crystal cell with a passive matrix electrode array in accordance with an embodiment.

As shown in the example of FIG. 3, finger electrodes 38 may extend along the X dimension on substrate 30, and finger electrodes 36 may extend along the Y dimension on substrate 32. If desired, finger electrodes 38 may extend along the Y dimension on substrate 30, and finger electrodes 36 may extend along the X dimension on substrate 32. The example of FIG. 3 is merely illustrative. Electrodes 36 and 38 may be formed from transparent conductive material such as indium tin oxide, conductive polymers such as poly(3,4-ethylenedioxythiophene) polystyrene sulfonate (PEDOT:PPS), silver nanowires, or other transparent electrode structures and may be located on outer and/or inner surfaces of substrates 32 and 30.

In the example of FIG. 3, electrodes 38 and 36 are oriented at 90 degrees relative to one another. This is merely illustrative. In general, electrodes 38 and 36 may be separated by 60 degrees, 80 degrees, 110 degrees, 130 degrees, 160 degrees, and/or any other suitable angle between 0 degrees and 180 degrees. Arrangements in which electrodes 38 and 36 are orthogonal to one another are sometimes described herein as an illustrative example.

In a passive matrix driving scheme where electrodes 38 and electrodes 36 are patterned finger electrodes extending in two orthogonal (or otherwise non-parallel) directions, control circuitry 26 may be configured to control the phase profile of liquid crystal layer 34 along two dimensions. The voltage at each liquid crystal "pixel" where a given upper electrode 36 overlaps a given lower electrode 38 may be equal to the difference between the voltage applied to that upper electrode 36 and the voltage applied to that lower electrode 38. By controlling the voltages on electrodes 36 and electrodes 38, the index of refraction of liquid crystal layer 34 of component 22 can be dynamically adjusted across two different directions (e.g., the X and Y dimensions of FIG. 3) to produce customized lenses.

When an electric field is applied to the liquid crystals of layer 34, the liquid crystals change orientation. The speed at which a given liquid crystal material can be reoriented is limited by factors such as the thickness of layer 34 (e.g., thickness T1 of FIG. 2 or thickness T2 of FIG. 3, sometimes referred to as the cell gap). To increase the tuning speed of liquid crystal layer 34 while still achieving a suitable tuning range, adjustable lens component 22 may include two or more liquid crystal cells 40 stacked on top of one another. This type of arrangement is illustrated in FIG. 4.

Figure 4:
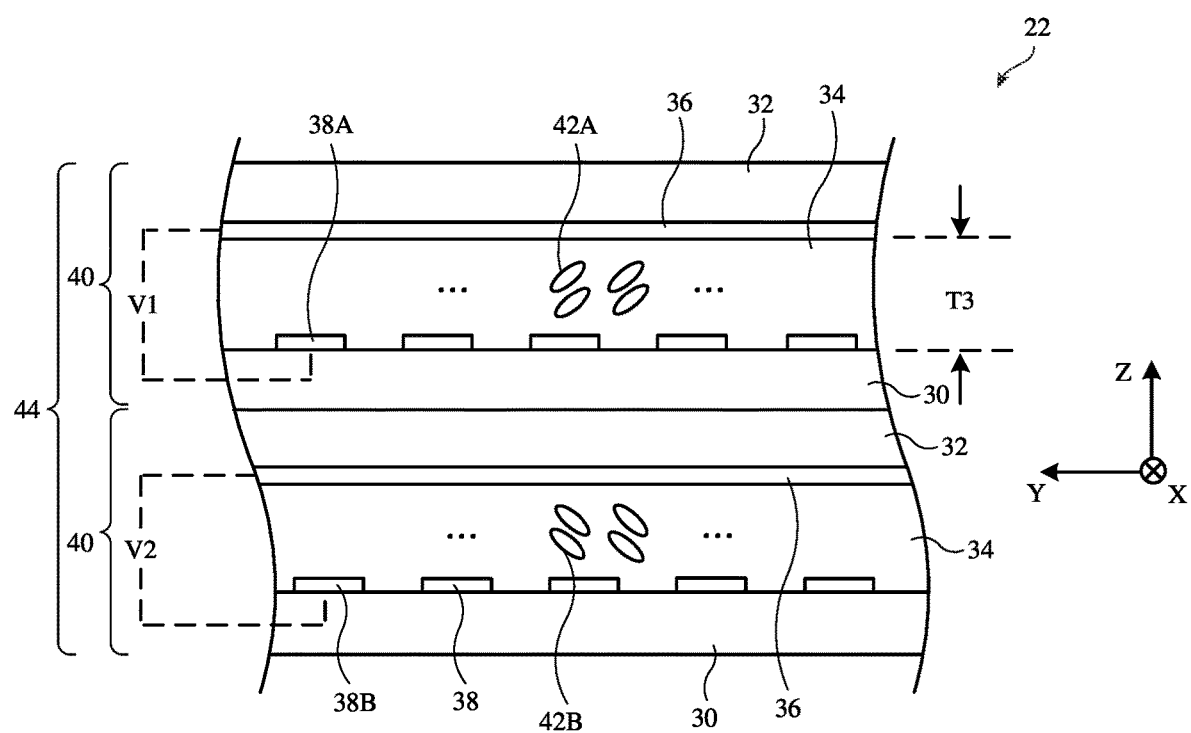
FIG. 4 is a cross-sectional side view of an illustrative liquid crystal module having first and second liquid crystal layers with antiparallel liquid crystal alignment orientations in accordance with an embodiment.

As shown in FIG. 4, adjustable lens component 22 may include liquid crystal module 44. Liquid crystal module 44 may include two or more liquid crystal cells 40. Each liquid crystal cell 40 may include liquid crystal layer 34 interposed between upper substrate 32 and lower substrate 30. Finger electrodes 38 may be formed on each lower substrate 30 and may extend parallel to the X-axis. Finger electrodes 36 of the type shown in FIG. 3 or a common electrode 54 of the type shown in FIG. 2 may be formed on each upper substrate 32.

The cell gap of each liquid crystal cell 40 in module 44 may be less than that of liquid crystal cell 40 of FIG. 2 or FIG. 3. For example, liquid crystal layers 34 of module 44 in FIG. 4 may each have a thickness T3, which is less than thickness T1 of FIG. 2 and less than thickness T2 of FIG. 3. The reduced cell gap increases the tuning speed of liquid crystal layers 34 while still maintaining satisfactory tuning range (sometimes referred to as lens power range).

If desired, the liquid crystal alignment orientation (sometimes referred to as a rubbing direction) of liquid crystal cells 40 in module 44 may be antiparallel. In particular, liquid crystal molecules 42A of upper liquid crystal cell 40 may have a first liquid crystal alignment orientation, and liquid crystal molecules 42B of lower liquid crystal cell 40 may have a second liquid crystal alignment orientation that is antiparallel to the first liquid crystal alignment orientation. This type of arrangement may help reduce the angle dependency of phase retardation in module 44.

Overlapping portions of the two liquid crystal layers 34 in module 44 may be controlled using the same or different voltages to achieve the desired index of refraction at that portion of module 44. For example, electrode 38A of upper liquid crystal cell 40 in module 44 may overlap electrode 38B of lower liquid crystal cell 40 in module 44. A first voltage V1 may be applied across a portion of upper liquid crystal layer 34 overlapping electrode 38A, and a second voltage V2 may be applied across a portion of lower liquid crystal layer 34 overlapping electrode 38B. Voltages V1 and V2 may be different or may be the same. Control circuitry 26 may determine the ratio of V1 to V2 based on the desired index of refraction at that portion of the liquid crystal module 44 and based on the disposition of the user's eyes 16.

Due to the nonlinearity of liquid crystal material, a single liquid crystal cell that is driven with a passive matrix addressing scheme may exhibit unwanted aberrations. Such aberrations can be mitigated or eliminated by stacking multiple liquid crystal cells with passive matrix electrode arrays oriented in different directions so that unwanted aberrations can be compensated for by applying appropriate voltages to the different liquid crystal cells. This type of arrangement is illustrated in FIG. 5.

Figure 5:
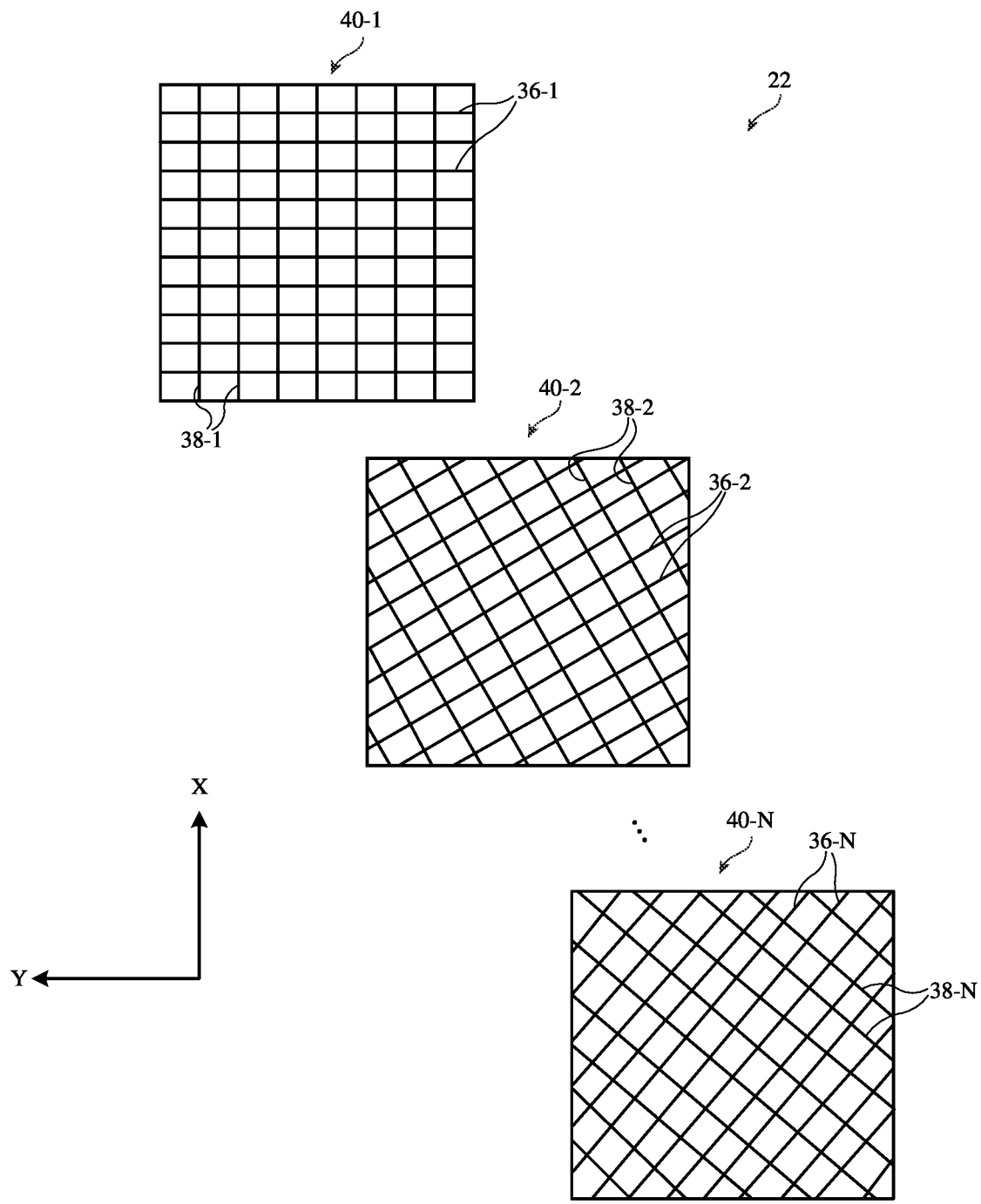
FIG. 5 is a diagram showing illustrative stacked liquid crystal cells having passive matrix electrode arrays with different orientations in accordance with an embodiment.

As shown in FIG. 5, adjustable lens 22 may include N liquid crystal cells such as liquid crystal cell 40-1, liquid crystal cell 40-2, etc., up to liquid crystal cell 40-N. There may be any suitable number of stacked liquid crystal cells 40 in lens 22 (e.g., two, three, four, five, six, seven, eight, nine, ten, eleven, twelve, more than twelve, less than twelve, etc.).

Liquid crystal cell 40-1 may have a pair of electrode arrays such as finger electrodes 38-1 oriented along a first direction and finger electrodes 36-1 oriented along a second direction orthogonal (or otherwise non-parallel) to the first direction. Finger electrodes 38-1 may, for example, extend parallel to the X-axis of FIG. 5, whereas finger electrodes 36-1 may extend parallel to the Y-axis of FIG. 5. Electrodes 36-1 and 38-1 may modulate the phase profile of liquid crystal layer 34 in cell 40-1 along first and second dimensions.

Liquid crystal cell 40-2 may have an additional pair of electrode arrays such as finger electrodes 38-2 and finger electrodes 36-2 that are configured to modulate the phase profile of liquid crystal layer 34 in cell 40-2 along two orthogonal (or otherwise non-parallel) dimensions. Electrodes 38-2 and 36-2 may be rotated relative to the electrodes in other liquid crystal cells in the stack. For example, finger electrodes 38-2 may be rotated by a given amount relative to finger electrodes 38-1, and finger electrodes 36-2 may be rotated by the same amount relative to finger electrodes 36-1.

Liquid crystal cell 40-N may have an additional pair of electrode arrays such as finger electrodes 38-N and finger electrodes 36-N that are configured to modulate the phase profile of a liquid crystal layer 34 in cell 40-N along two orthogonal (or otherwise non-parallel) dimensions. Electrodes 38-N and 36-N may be rotated relative to the electrodes in other liquid crystal cells in the stack. For example, finger electrodes 38-N may be rotated by a given amount relative to finger electrodes 38-1, and finger electrodes 36-N may be rotated by the same amount relative to finger electrodes 36-1.

The amount of rotation relative to electrodes in other liquid crystal cells may, if desired, be based on the total number of liquid crystal cells in lens 22. For example, in arrangements where lens 22 includes six stacked liquid crystal cells, each electrode pair may be rotated relative to another electrode pair by 15 degrees, if desired. In other words, electrodes 38-1 and 36-1 in cell 40-1 would be oriented at zero degrees relative to the X and Y axes of FIG. 5, respectively; electrodes 38-2 and 36-2 in cell 40-2 would be oriented at 15 degrees relative to the X and Y axes of FIG. 5, respectively; electrodes 38 and 36 in a third cell 40 would be oriented at 30 degrees relative to the X and Y axes of FIG. 5, respectively; electrodes 38 and 36 in a fourth cell 40 would be oriented at 45 degrees relative to the X and Y axes of FIG. 5, respectively; electrodes 38 and 36 in a fifth cell 40 would be oriented at 60 degrees relative to the X and Y axes of FIG. 5, respectively; and electrodes 38 and 36 in the sixth cell 40 would be oriented at 75 degrees relative to the X and Y axes of FIG. 5, respectively.

This is, however, merely illustrative. There may be any suitable number of stacked liquid crystal cells in lens 22 with any suitable amount of rotation between electrode orientations (e.g., eight cells 40 with 11.25 degrees of rotation between electrode orientations, ten cells 40 with 9 degrees of rotation between electrode orientations, four cells 40 with 22.5 degrees of rotation between electrode orientations, twelve cells 40 with 7.5 degrees of rotation between electrode orientations, etc.).

The use of equal angular spacing between electrode arrays is merely illustrative. In some applications, such as when a specific orientation (or several orientations) of astigmatism (or other non-rotationally-symmetric aberration) can be anticipated at the time of designing lens 22, it may be desirable to implement an uneven angular spacing between electrode orientations that permit better performance at that specific orientation or orientations where the astigmatism can be anticipated. For example, the astigmatism of certain progressive power ophthalmic lenses can have a predominant orientation. In that case, an uneven distribution of orientations of electrodes 38-1, 38-2 . . . 38-N that takes into account the known orientation of the astigmatism may be used, if desired.

In the example of FIG. 5, each liquid crystal cell 40 is shown having first and second electrode arrays oriented at 90 degrees relative to one another. This is merely illustrative. If desired, the first and second electrode arrays in each liquid crystal cell 40 may be oriented at any other suitable angle (e.g., 60 degrees, 80 degrees, 110 degrees, 130 degrees, 160 degrees, etc.) relative to one another.

Arrangements in which at least two of liquid crystal cells 40 in lens 22 have different angles between their respective first and second electrode arrays may also be used. For example, liquid crystal cell 40-1 may have first and second electrode arrays oriented at 90 degrees relative to one another, whereas liquid crystal cell 40-2 may have first and second electrode arrays oriented at 80 degrees relative to one another. In this type of scenario, the amount of rotation between electrodes 36-1 of cell 40-1 and electrodes 36-2 of cell 40-2 may be different than the amount of rotation between electrodes 38-1 of cell 40-1 and electrodes 38-2 of cell 40-2. For example, electrodes 36-1 of cell 40-1 may be rotated relative to electrodes 36-2 of cell 40-2 by some nonzero amount, whereas electrodes 38-1 of cell 40-1 may be parallel to electrodes 38-2 of cell 40-2 (or may otherwise be rotated relative to electrodes 38-2 by an angle different from the angle between electrodes 36-1 and 36-2).

Lens components 22 with multiple orientations of electrodes may be configured to correct for optical aberrations such as progressive or static myopia, hyperopia, presbyopia, defocus, astigmatism, coma, trefoil, spherical, and/or other aberrations that may be fixed or accommodation-dependent. Arrangements in which adjustable lens components 22 include six orientations of electrodes are sometimes described herein as an illustrative example.

Liquid crystal cells 40 having a parallel or antiparallel rubbing direction modulate normally incident light of one linear polarization. When a user is viewing unpolarized content, it may be desirable to include a second set cells 40 with an orthogonal rubbing direction relative to the first set of cells 40 in lenses 22. For example, each lens 22 may include two sets of the liquid crystal cells 40 shown in FIG. 5. The second set of cells 40 may have the same set of orientations of electrodes as the first set of cells 40 or may have a distinct set of orientations.

In some arrangements, control circuitry 26 may modulate the lens power across the entirety of each lens component 22. This type of arrangement may be useful in configurations where glasses 14 do not include sensors for eye tracking and/or when the tuning speed of lens components 22 is not sufficiently high to maintain focus when the user's eye moves. Modulating the lens power from edge to edge of components 22 may ensure that the image remains in focus even when the user's eye moves around.

In other arrangements, control circuitry 26 may modulate lens power across only a portion of lens component 22. This type of foveated lens arrangement is illustrated in FIG. 6.

Viewers are most sensitive to image detail in the main field of view. Peripheral regions of a lens may therefore be provided with a different phase profile than the region of the lens within the user's gaze. The peripheral regions of the lens that are outside of the viewer's gaze may, for example, be optically unmodulated, may be provided with a phase profile that is constant across a given area, and/or may be provided with a phase profile that is less spatially varied than the portion of the lens in the direction of the viewer's gaze. The regions of the lens outside of the user's gaze may have an optical power magnitude that is less than the optical power magnitude of the lens region within the user's gaze. By including lower power areas in a variable-power lens, total required variable phase depth and power consumption can be minimized and/or reduced. Further, magnification changes (which could be disorienting to the user) are experienced only over the area of the lens where focal power is modulated. Gaze detection data (e.g., gathered using sensor system 24) may be used in determining which portion of lens component 22 is being directly viewed by viewer 16 and should therefore have the optically appropriate prescription and which portions of lens components 22 are in the viewer's peripheral vision and could be left optically unmodulated or otherwise provided with a phase profile having less spatial variation than the portions of lens components 22 within the viewer's gaze.

Figure 6:
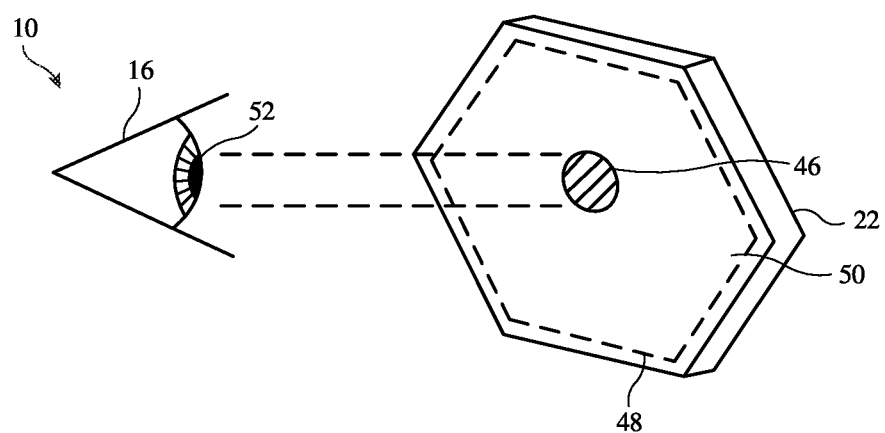
FIG. 6 is a perspective view of a foveated adjustable lens system in accordance with an embodiment.

As shown in FIG. 6, for example, adjustable lens component 22 may have an active area such as active area 48. Within active area 48, adjustable lens components 22 may include one or more materials having an electrically adjustable index of refraction (e.g., liquid crystal cells 40 of the type discussed in connection with FIGS. 2-5). Control circuitry 26 may dynamically adjust the phase profile of lens components 22. Active area 48 may include gaze area 46 and peripheral area 50. Gaze area 46 corresponds to the portions of lens components 22 that are within the user's gaze, whereas peripheral area 50 corresponds to the portions of lens components 22 that are outside of the user's gaze (e.g., portions of lens components 22 that are in the user's peripheral vision). Gaze area 46 of lens components 22 may be provided with a different phase profile than peripheral area 50. For example, gaze area 46 may be optically modulated to produce a first lens power, while peripheral area 50 may be left optically unmodulated, may be optically modulated to produce a second lens power magnitude that is less than the first lens power magnitude, and/or may be optically modulated to produce a phase profile that is less spatially varied than the phase profile of gaze area 46.

Control circuitry 26 may dynamically adjust the location, size, resolution, or shape of gaze area 46 and peripheral area 50 during operation of glasses 14. For example, control circuitry 26 may use sensor system 24 to track a user's gaze and may adjust the location of gaze area 46 so that it remains aligned with the user's gaze. If desired, the size of gaze area 46 may be based on the size of the foveal region in a user's eyes, the user's pupil diameter, and/or the desired phase profile for gaze area 46. Gaze area 46 may, for example, have a diameter between 4 mm and 9 mm, between 7 mm and 9 mm, between 6 mm and 10 mm, between 4 mm and 8 mm, between 8 mm and 12 mm, greater than 10 mm, less than 10 mm, or any other suitable size. The size of gaze area 46 may be based on a distance between lens components 22 and a user's eyes 16, may be based on the size of the user's pupil 52 (e.g., as measured with sensor system 24 or as inferred based on eye charts, ambient light levels, or other data), and/or may be based on other information.

In gaze area 46, control circuitry 26 may modulate the index of refraction of liquid crystal material 34 to obtain the desired lens power and the desired vision correction properties for the viewer. This may include, for example, controlling each of finger electrodes 36 and 38 independently or controlling small sets of finger electrodes 36 and 38 with common control signals. In peripheral area 50, control circuitry 26 may control larger sets of finger electrodes 36 and 38 with common control signals and/or may provide a ground or baseline voltage to finger electrodes 36 and 38 (e.g., may deactivate some finger electrodes 36 and 38). If desired, optical power may be constant across gaze area 46 and phase may be flat across peripheral area 50. In other suitable arrangements, optical power may be varied across gaze area 46 and/or peripheral area 50.

Figure 7:
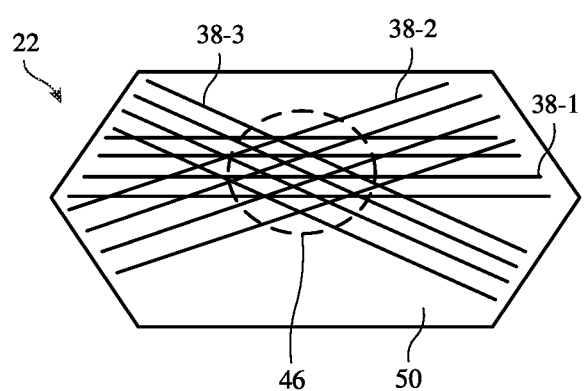
FIG. 7 is a top view of an illustrative adjustable lens system having a subset of electrodes driven to create a lens patch with variable optical power that aligns with a user's gaze in accordance with an embodiment.

FIG. 7 is a top view of illustrative adjustable lens components 22 showing how areas of different optical power magnitude may be achieved. As shown in FIG. 7, adjustable lens components 22 may include gaze area 46 and peripheral area 50. Gaze area 46 may have a first lens power magnitude and peripheral area 46 may have a second lens power magnitude that is less than the first lens power magnitude. Gaze area 46 may, for example, align with the foveal region of a user's eyes 16 (as shown in FIG. 6). Electrodes that overlap (i.e., pass through) gaze area 46 such as electrodes 38-1, 38-2, and 38-3 (as well as electrodes 36 not shown in FIG. 7 that are orthogonal to electrodes 38-1, 38-2, and 38-3 and pass through gaze area 46) may be controlled to make a desired prescription within gaze area 46, while electrodes 36 and 38 that do not pass through gaze area 46 (not shown in FIG. 7) may be controlled to produce a spatially constant phase or a phase that otherwise has less spatial variation than that of gaze area 46.

Control circuitry 26 may dynamically adjust the location of gaze area 46 based on gaze location information from sensor system 24 by actively identifying which electrodes are within a user's gaze and which electrodes are outside of a user's gaze. Electrodes within a user's gaze (e.g., in area 46) may be operated in optically modulated mode, and electrodes outside of the user's gaze (e.g., in area 50) may be operated in constant voltage mode or may otherwise be operated to produce a phase profile with less spatial variation than that of gaze area 46.

Whereas lens components with only two different electrode orientations may be capable of expressing spherical profiles and correcting one of two modes of astigmatism, lens components with three or more electrode orientations may be capable of expressing a greater number of different types of phase profiles (to correct higher order aberrations, astigmatism with any rotational axis, coma, spherical aberration, etc.). Additionally, using more than two electrode orientations may help case the transition between gaze region 46 (e.g., where the phase profile of liquid crystal layer 34 is actively controlled) and peripheral region 50 (e.g., where the phase profile of liquid crystal layer 34 is not actively controlled).

The foregoing examples in which lens components 22 have a rectangular shape or a hexagonal shape are merely illustrative. If desired, lens component 22 (e.g., substrate 30, substrate 32, liquid crystal layer 34, etc.) may have circular shapes, triangular shapes, pentagonal shapes, oval shapes, ergonomic shapes, convex shapes, or any other suitable shape. Arrangements in which lens components 22 are hexagonal are sometimes described herein as an illustrative example.

Figure 8:
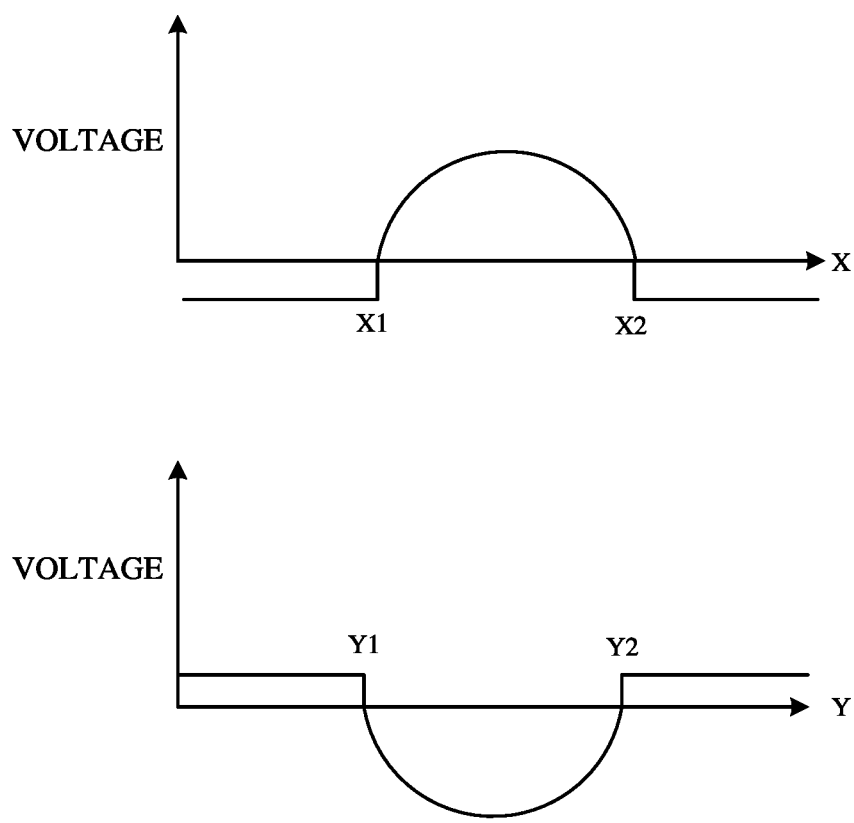
FIG. 8 is a set of graphs showing illustrative voltage profiles for a liquid crystal cell with a passive matrix electrode array in accordance with an embodiment.

FIG. 8 is a diagram showing examples of illustrative voltage profiles that may be applied to a pair of orthogonal (or otherwise non-parallel) electrode arrays in a given passive matrix liquid crystal cell 40 of the type shown in FIG. 3. The upper graph of FIG. 8 shows an illustrative voltage profile that may be applied to upper electrodes 36 (e.g., electrodes that extend parallel to the Y-axis of FIG. 3), while the lower graph of FIG. 8 shows an illustrative voltage profile that may be applied to lower electrodes 38 (e.g., electrodes that extend parallel to the X-axis of FIG. 3). In the example of FIG. 8, electrodes 36 between locations X1 and X2 pass through gaze area 46, while electrodes 36 that are not between locations X1 and X2 do not pass through gaze region 46. Similarly, electrodes 38 between locations Y1 and Y2 pass through gaze area 46, while electrodes 38 that are not between locations Y1 and Y2 do not pass through gaze region 46.

In the example of FIG. 8, the voltage profile is constant across electrodes 36 that are not between locations X1 and X2 and is varied across electrodes 36 that are between locations X1 and X2. At the same time, the voltage profile is constant across electrodes 38 that are not between locations Y1 and Y2 and is varied across electrodes 38 that are between locations Y1 and Y2. The voltage profiles of FIG. 8 are merely illustrative examples of the types of voltage profiles that can be applied across two dimensions of each liquid crystal cell 40. In general, any suitable voltage profile may be applied across electrodes 36 and 38 of each liquid crystal cell 40.

For electrodes 36 and 38 that do not overlap gaze area 46 (e.g., electrodes 36 that are not located between locations X1 and X2 and electrodes 38 that are not located between locations Y1 and Y2), it may be desirable to apply a non-zero constant voltage to avoid creating erroneous voltages in peripheral area 50. For example, if electrodes 36 that overlap gaze area 46 receive a positive voltage, as in the example of FIG. 8, then electrodes 36 that do not overlap gaze area 46 may receive a negative constant voltage (e.g., a voltage slightly less than zero volts). If electrodes 38 that overlap gaze area 46 receive a negative voltage, as in the example of FIG. 8, then electrodes 38 that do not overlap gaze area 46 may receive a positive constant voltage (e.g., a voltage slightly greater than zero volts). An alternative scheme for assigning constant voltages is to drive electrodes 36 that are not between X1 and X2 to the maximum available voltage and drive electrodes 38 that are not between Y1 and Y2 to the minimum (most negative) available voltage. These are, however, merely illustrative examples. If desired, electrodes 36 and 38 that do not overlap gaze area 46 may receive a constant voltage equal to zero, or may have other suitable voltage profiles to smooth the optical transition between areas 46 and 50, avoid artifacts in area 50, or have other desirable properties.

While some optical aberrations result from the nonlinearity of the liquid crystal material, these optical aberrations are mostly spherical aberrations that can be removed using other liquid crystal layers in the stack. Numerical optimization techniques may be used to search for low-aberration passive matrix lenses. For example, for a given optical power and/or a given optical aberration correction, computing equipment may make an initial guess of the voltage profile for each liquid crystal cell 40 in lens 22 (e.g., a set of voltages for electrodes 36 and 38 in each cell 40), followed by an iterative process to refine the voltage profiles to the best final result that satisfies a figure of merit (e.g., least squares method, minimization techniques, making a derivative equal to zero by comparing and filtering intermediate results, etc.). In general, any suitable numerical optimization method may be used to obtain the voltage profiles that give the closest match to the target lens characteristics. These voltage profiles may be stored in a look-up table in device 14 so that control circuitry 26 can drive each passive matrix cell with the appropriate set of voltages that minimizes aberrations while achieving the desired lens power and/or optical aberration correction.

Figure 9:
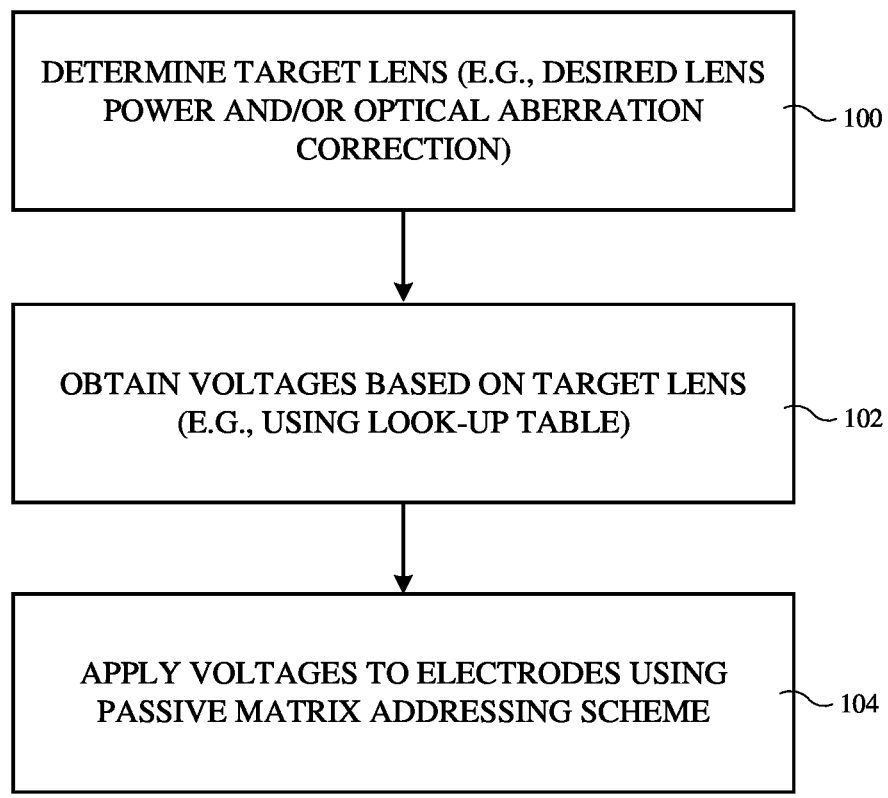
FIG. 9 is a flow chart of illustrative steps involved in operating an adjustable lens having stacked liquid crystal cells with passive matrix electrode arrays oriented in different directions in accordance with an embodiment.

FIG. 9 is a flow chart of illustrative steps involved in operating an adjustable lens having stacked liquid crystal layers with passive matrix electrode arrays.

During the operations of block 100, control circuitry 26 may determine target lens characteristics for each adjustable lens 22 (e.g., for left and right lenses 22 in glasses 14). This may include, for example, determining the target lens power of gaze area 46 (e.g., a lens power ranging from −1.3 diopters to 1.1 diopters, from −1.5 diopters to 1.5 diopters, from −0.85 diopters to 0.75 diopters, −2 diopters to 1.4 diopters, −2 diopters to 2 diopters, −3 diopters to 3 diopters, greater than 2 diopters, less than −2 diopters, or any other suitable lens power) and, if desired, determining a target aberration correction such as defocus, astigmatism, coma, trefoil, spherical, and/or other aberrations. In some scenarios, the target lens may have a nonzero lens power without correcting for any other optical aberrations. In other scenarios, the target lens may have zero lens power but may correct for optical aberrations such as astigmatism, coma, trefoil, spherical, etc. In still other scenarios, the target lens may have a nonzero lens power while also correcting for higher-order optical aberrations (e.g., the target lens may have a positive lens power while also correcting for horizontal coma, a negative lens power while also correcting for astigmatism, and/or any other suitable combination of positive or negative lens power with higher-order aberration correction such as astigmatism, coma, trefoil, spherical, etc.).

During the operations of block 102, control circuitry 26 may determine a voltage profile for each set of electrodes in each lens 22 based on the target lens characteristics determined during the operations of block 100. This may include using stored data such as a look-up table stored in control circuitry 26 to look up the appropriate voltages based on the desired target lens. The voltage profiles stored in control circuitry 26 may be based on data gathered using numerical optimization techniques during design and manufacturing to find optimal voltages for different target lenses. For example, if the target lens is a positive lens power such as 1.1 diopters that also corrects a higher-order aberration such as vertical coma, then control circuitry 26 may use a look-up table that specifically sets out voltage profiles for a 1.1 diopter lens that corrects for vertical coma. The look-up table may specify voltages for electrodes 36 and electrodes 38 in each liquid crystal cell 40 in each lens 22. In other words, if each lens 22 has six stacked liquid crystal cells 40, then control circuitry 26 may obtain six different voltage profiles for each lens 22, with each voltage profile specifying a set of voltages for electrodes 36 and a set of voltages for electrodes 38 in a given liquid crystal cell 40.

During the operations of block 104, control circuitry 26 may apply the voltage profiles obtained during the operations of block 102 to electrodes 36 and 38 in each liquid crystal cell 40 of each lens 22. In a passive matrix driving scheme with stacked liquid crystal cells 40 having electrodes with different orientations (e.g., stacked liquid crystal cells 40 of FIG. 5), control circuitry 26 may apply a first set of voltages to electrodes 36-1 and 38-1 of cell 40-1 to create a first phase profile across liquid crystal layer 34 of cell 40-1, may apply a second set of voltages to electrodes 36-2 and 38-2 of cell 40-2 to create a second phase profile across liquid crystal layer 34 of cell 40-2, etc., and may apply an Nth set of voltages to electrodes 36-N and 38-N of cell 40-N to create an Nth phase profile across liquid crystal layer 34 of cell 40-N. The different phase profiles created in the stacked liquid crystal cells in lens 22 may provide lens 22 with the target lens characteristics (e.g., the desired lens power and/or optical aberration correction).

The foregoing is merely illustrative and various modifications can be made to the described embodiments. The foregoing embodiments may be implemented individually or in any combination.

What is claimed is:

1. An adjustable lens, comprising:
   a first liquid crystal cell comprising a first liquid crystal layer interposed between first and second substrates and first and second orthogonal arrays of transparent conductive electrodes, wherein the first array comprises first strip-shaped electrodes that are parallel with one another, the second array comprises second strip-shaped electrodes that are parallel with one another, and the first array is orthogonal with respect to the second array;
   a second liquid crystal cell stacked with the first liquid crystal cell, the second liquid crystal cell comprising a second liquid crystal layer interposed between third and fourth substrates and third and fourth orthogonal arrays of transparent conductive electrodes, wherein the third array comprises third strip-shaped electrodes that are parallel with one another, the fourth array comprises fourth strip-shaped electrodes that are parallel with one another, and the third array is orthogonal with respect to the fourth array, and wherein the third and fourth orthogonal arrays of transparent conductive electrodes are rotated relative to the first and second orthogonal arrays of transparent conductive electrodes by a nonzero angle that is less than 90 degrees; and
   control circuitry that applies a first set of voltages across the first and second orthogonal arrays of transparent conductive electrodes to create a first phase profile across the first liquid crystal layer and a second set of voltages across the third and fourth orthogonal arrays of transparent conductive electrodes to create a second phase profile across the second liquid crystal layer.

2. The adjustable lens defined in claim 1 wherein the second phase profile is different from the first phase profile.

3. The adjustable lens defined in claim 1 wherein the control circuitry stores data that maps different sets of lens characteristics to different voltage profiles and wherein the first and second sets of voltages are based on the data.

4. The adjustable lens defined in claim 3 wherein the data comprises numerically optimized data.

5. The adjustable lens defined in claim 3 wherein the lens characteristics comprise at least one of a target lens power and a target optical aberration correction.

6. The adjustable lens defined in claim 5 wherein the target lens power is between −2 diopters and 2 diopters.

7. The adjustable lens defined in claim 5 wherein the target optical aberration correction is selected from the group consisting of: defocus, astigmatism, coma, trefoil, and spherical.

8. The adjustable lens defined in claim 1 wherein the transparent conductive electrodes in the first and second orthogonal arrays and the third and fourth orthogonal arrays comprise a material selected from the group consisting of: indium tin oxide, conductive polymer, and silver nanowire.

9. The adjustable lens defined in claim 1 wherein the first, second, third, and fourth substrates comprise a material selected from the group consisting of: glass and flexible polymer.

10. The adjustable lens defined in claim 1 wherein the first and second liquid crystal cells are stacked with at least four other liquid crystal cells and wherein the four other liquid crystal cells each have a pair of orthogonal arrays of transparent electrodes that are angled with respect to the first, second, third, and fourth orthogonal arrays.

11. An adjustable lens configured to be worn in front of a user's eye, comprising:
 an electrically modulated optical material interposed between first and second transparent substrates;
 a first array of finger electrodes on the first transparent substrate;
 a second array of finger electrodes on the second transparent substrate, wherein the second array of finger electrodes is non-parallel to the first array of finger electrodes;
 third and fourth arrays of finger electrodes, wherein the third and fourth arrays are non-parallel to one another and are rotated with respect to the first and second arrays by a non-zero angle that is less than 90 degrees;
 an additional electrically modulated optical material overlapping the electrically modulated optical material and interposed between the third and fourth arrays of finger electrodes; and
 control circuitry that applies voltages to the first and second arrays of finger electrodes to adjust a phase profile of the electrically modulated optical material, wherein the voltages are based on numerically optimized data that maps different target lens characteristics to different voltage profiles, and wherein the numerically optimized data is stored in the control circuitry.

12. The adjustable lens defined in claim 11 wherein the target lens characteristics comprise at least one of a target lens power and a target optical aberration correction.

13. The adjustable lens defined in claim 11 wherein the electrically modulated optical material comprises liquid crystal material.

14. The adjustable lens defined in claim 11 wherein the first and second transparent substrates comprise a material selected from the group consisting of: glass and flexible polymer.

15. Eyeglasses, comprising:
 a housing;
 an adjustable lens in the housing having a stack of liquid crystal cells comprising respective passive matrix electrode arrays, wherein at least one of the passive matrix electrode arrays is rotated relative to at least one of the other passive matrix electrode arrays by a non-zero angle that is less than 90 degrees, and wherein each of the passive matrix electrode arrays comprises first strip-shaped electrodes that are parallel with one another and second strip-shaped electrodes that are parallel with one another, wherein the first strip-shaped electrodes are orthogonal with respect to the second strip-shaped electrodes; and
 control circuitry that applies different voltage profiles to the respective passive matrix electrode arrays to produce a given set of lens characteristics in the adjustable lens.

16. The eyeglasses defined in claim 15 wherein the control circuitry stores a look-up table that maps target lens characteristics to voltages.

17. The eyeglasses defined in claim 16 wherein the target lens characteristics comprise at least one of a target lens power and a target optical aberration correction.

18. The eyeglasses defined in claim 15 wherein the stack of liquid crystal cells comprises six stacked liquid crystal cells.

19. The eyeglasses defined in claim 18 wherein each of the passive matrix electrode arrays is rotated relative to at least one of the other passive matrix electrode arrays by fifteen degrees.

* * * * *